United States Patent
Yi et al.

(10) Patent No.: US 10,555,326 B2
(45) Date of Patent: Feb. 4, 2020

(54) METHOD FOR PERFORMING A LOGICAL CHANNEL PRIORITIZATION IN A CARRIER AGGREGATION WITH AT LEAST ONE SCELL OPERATING IN AN UNLICENSED SPECTRUM AND A DEVICE THEREFOR

(71) Applicant: LG ELECTRONICS INC., Seoul (KR)

(72) Inventors: Seungjune Yi, Seoul (KR); Sunyoung Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/567,545

(22) PCT Filed: May 11, 2016

(86) PCT No.: PCT/KR2016/004939
§ 371 (c)(1),
(2) Date: Oct. 18, 2017

(87) PCT Pub. No.: WO2016/182345
PCT Pub. Date: Nov. 17, 2016

(65) Prior Publication Data
US 2018/0124802 A1    May 3, 2018

Related U.S. Application Data

(60) Provisional application No. 62/160,577, filed on May 12, 2015.

(51) Int. Cl.
*H04W 72/10* (2009.01)
*H04W 72/14* (2009.01)
(Continued)

(52) U.S. Cl.
CPC .......... *H04W 72/10* (2013.01); *H04W 72/14* (2013.01); *H04W 88/02* (2013.01); *H04W 88/08* (2013.01)

(58) Field of Classification Search
CPC ....... H04L 5/001; H04L 5/0064; H04L 69/14; H04W 72/10; H04W 72/14; H04W 74/0808; H04W 88/02; H04W 88/08
See application file for complete search history.

(56) References Cited

U.S. PATENT DOCUMENTS

2012/0250631 A1    10/2012    Hakola et al.
2014/0036818 A1    2/2014    Koskela et al.
(Continued)

FOREIGN PATENT DOCUMENTS

WO    2015063962 A1    3/2017

OTHER PUBLICATIONS

LG Electronics: "Logical Channel Prioritization in LAA", R2-151347, 3GPP TSG RAN WG2 Meeting #89bis, Bratislava, Slovakia, Apr. 20-24, 2015.

*Primary Examiner* — Khaled M Kassim
(74) *Attorney, Agent, or Firm* — Dentons US LLP

(57) ABSTRACT

The present invention relates to a wireless communication system. More specifically, the present invention relates to a method and a device for performing a LCP procedure in a carrier aggregation, the method comprising: configuring with a first cell group including at least one first cell and a second cell group including at least one second cell served by an eNB; configuring a plurality of logical channels, wherein each logical channel of the plurality of logical channels respectively corresponds to one of a first type logical channel that cannot be transmitted to the second cell and a second type logical channel that can be transmitted to the second cell; receiving a uplink grant for the first cell or (Continued)

the second cell; performing a Logical Channel Prioritization (LCP) procedure.

20 Claims, 18 Drawing Sheets

(51) Int. Cl.
    *H04W 88/02*     (2009.01)
    *H04W 88/08*     (2009.01)

(56) References Cited

U.S. PATENT DOCUMENTS

| | | | |
|---|---|---|---|
| 2014/0161108 A1* | 6/2014 | Lohr | H04L 5/0007 |
| | | | 370/336 |
| 2014/0241265 A1 | 8/2014 | Pragada et al. | |
| 2014/0362780 A1 | 12/2014 | Malladi et al. | |
| 2015/0163805 A1* | 6/2015 | Cattoni | H04W 74/006 |
| | | | 370/329 |
| 2015/0351095 A1* | 12/2015 | Wilhelmsson | H04W 72/0453 |
| | | | 370/329 |
| 2016/0029245 A1* | 1/2016 | Hong | H04W 28/0278 |
| | | | 370/329 |
| 2016/0157211 A1* | 6/2016 | Kato | H04W 16/32 |
| | | | 455/450 |
| 2016/0226632 A1* | 8/2016 | Zhang | H04L 1/1887 |
| 2016/0255665 A1* | 9/2016 | Futaki | H04W 52/36 |
| | | | 370/329 |
| 2016/0262149 A1* | 9/2016 | Futaki | H04W 16/32 |
| 2017/0318594 A1* | 11/2017 | Babaei | H04W 72/10 |

\* cited by examiner

FIG. 3
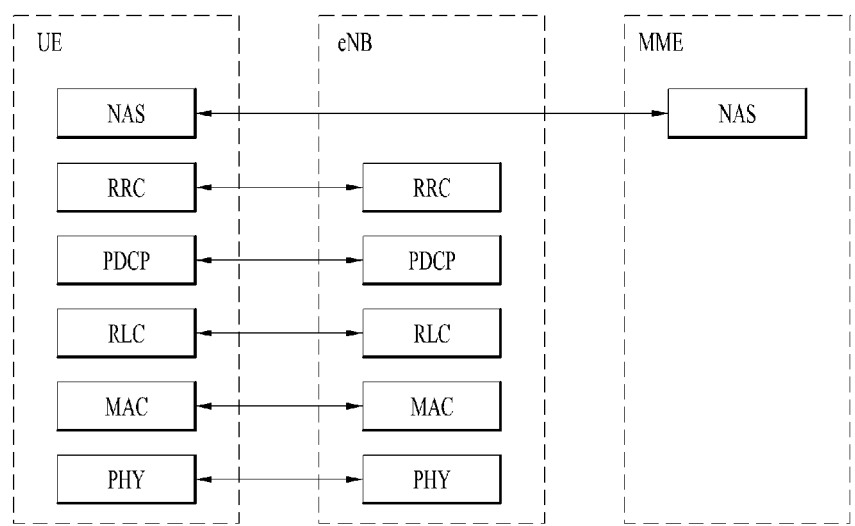
(a) Control-Plane Protocol Stack
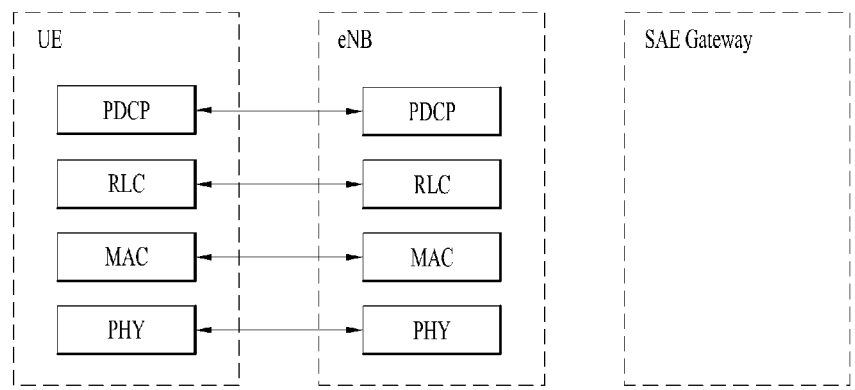
(b) User-Plane Protocol Stack

FIG. 13

```
-- ASN1START

LogicalChannelConfig ::=        SEQUENCE {
    ul-SpecificParameters           SEQUENCE {
        priority                        INTEGER (1 .. 16),
        prioritisedBitRate              ENUMERATED {
                                            kBps0, kBps8, kBps16, kBps32, kBps64, kBps128,
                                            kBps256, infinity, kBps512-v1020, kBps1024-v1020,
                                            kBps2048-v1020, spare5, spare4, spare3, spare2,
                                            spare1 },
        bucketSizeDuration              ENUMERATED {
                                            ms50, ms100, ms150, ms300, ms500, ms1000, spare2,
                                            spare1 },
        logicalChannelGroup             INTEGER (0 .. 3)        OPTIONAL       -- Need OR
    }       OPTIONAL,                                                          -- Cond UL
    ...,
    [[  logicalChannelSR-Mask-r9        ENUMERATED {setup}      OPTIONAL       -- Cond SRmask
    ]],
    [[  logicalChannelSR-Prohibit-r12   BOOLEAN                 OPTIONAL       -- Need ON
    ]]
}

-- ASN1STOP
```

METHOD FOR PERFORMING A LOGICAL CHANNEL PRIORITIZATION IN A CARRIER AGGREGATION WITH AT LEAST ONE SCELL OPERATING IN AN UNLICENSED SPECTRUM AND A DEVICE THEREFOR

This application is the National Phase of PCT International Application No. PCT/KR2016/004939, filed on May 11, 2016, which claims priorities under 35 U.S.C. 119(e) to U.S. Provisional Application No. 62/160,577, filed on May 12, 2015, which are hereby incorporated by reference herein in their entirety.

TECHNICAL FIELD

The present invention relates to a wireless communication system and, more particularly, to a method for performing a Logical Channel Prioritization in a carrier aggregation with at least one SCell operating in an unlicensed spectrum and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for performing a Logical Channel Prioritization in a Carrier aggregation with at least one SCell operating in an unlicensed spectrum.

The technical problems solved by the present invention are not limited to the above technical problems and those skilled in the art may understand other technical problems from the following description.

Technical Solution

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects

The invention is that the MAC entity performs LCP procedure for all or subset of configured logical channels depending on whether the UL grant is for a licensed band cell or unlicensed band cell, respectively.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 3 is a diagram showing a control plane and a user plane of a radio interface protocol between a UE and an E-UTRAN based on a 3rd generation partnership project (3GPP) radio access network standard;

FIG. 13 is an example for logical channel configuration information element;

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
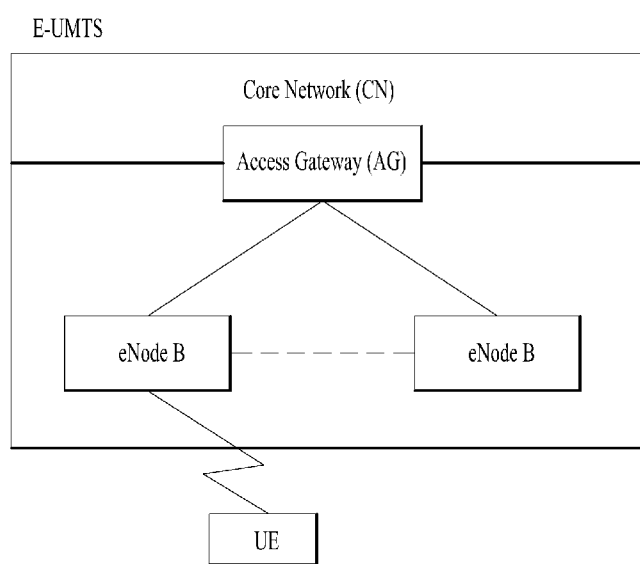
FIG. 1 is a diagram showing a network structure of an Evolved Universal Mobile Telecommunications System (E-UMTS) as an example of a wireless communication system.
Figure 2A:
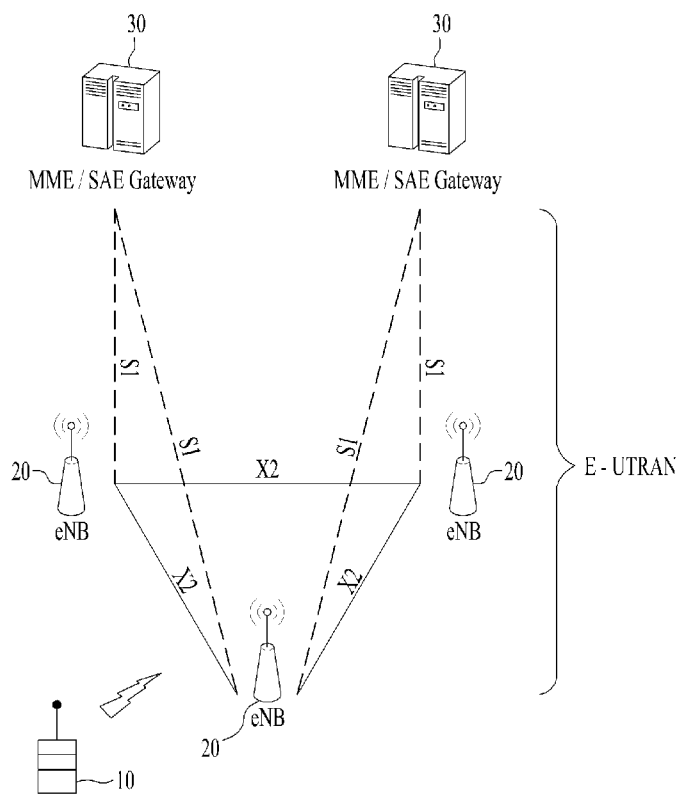
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
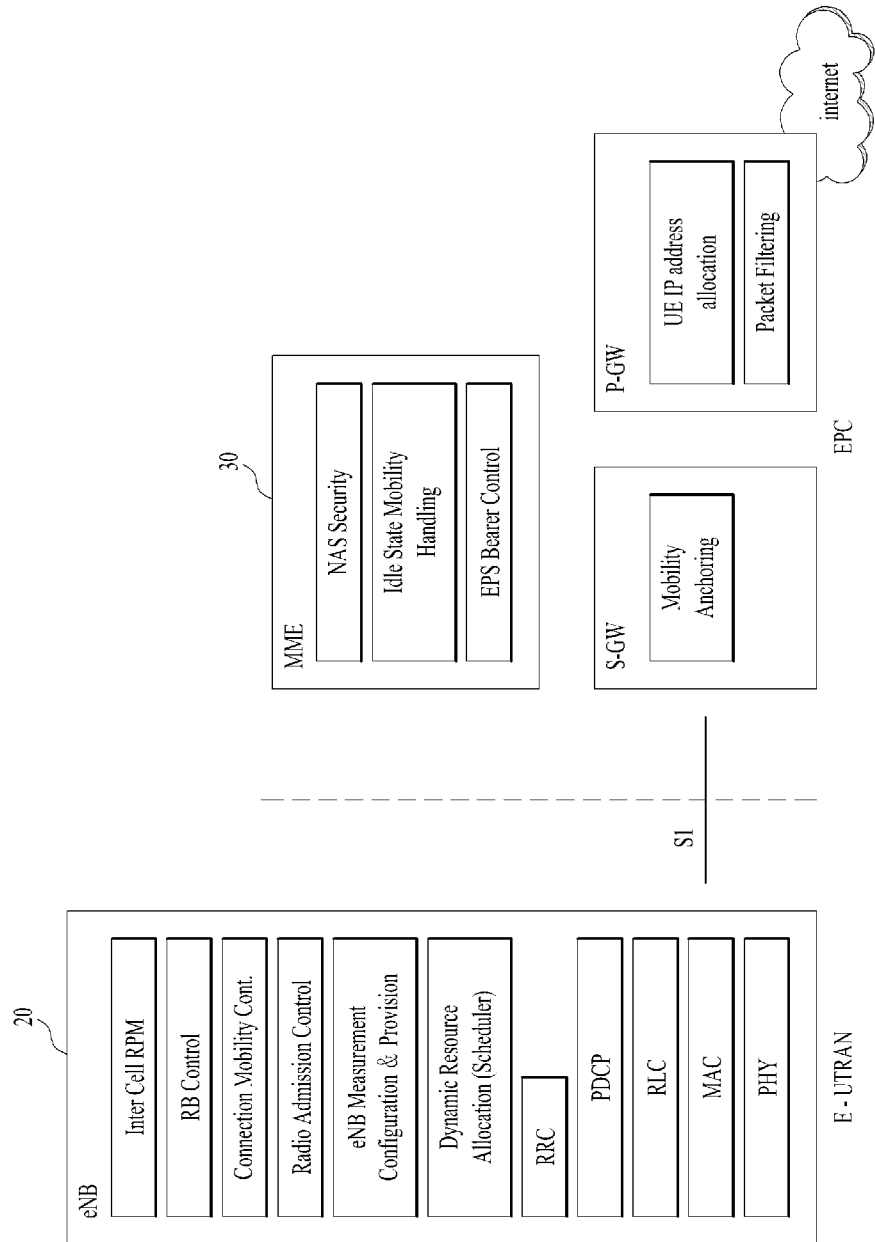
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
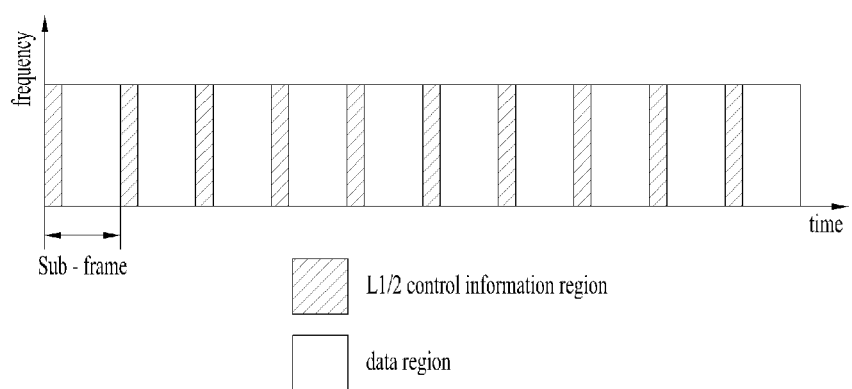
FIG. 4 is a view showing an example of a physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
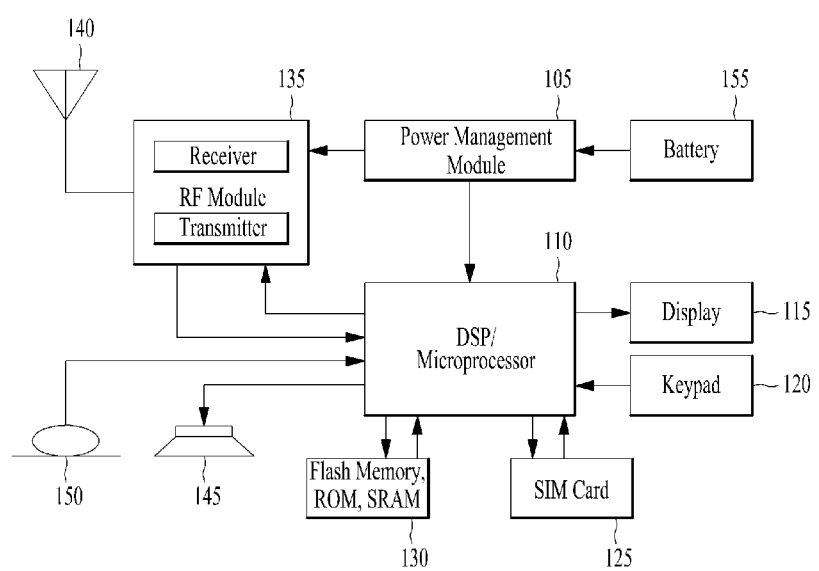
FIG. 5 is a block diagram of a communication apparatus according to an embodiment of the present invention.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transmiceiver; 135). The DSP/microprocessor (110) is electrically connected with the transciver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Figure 6:
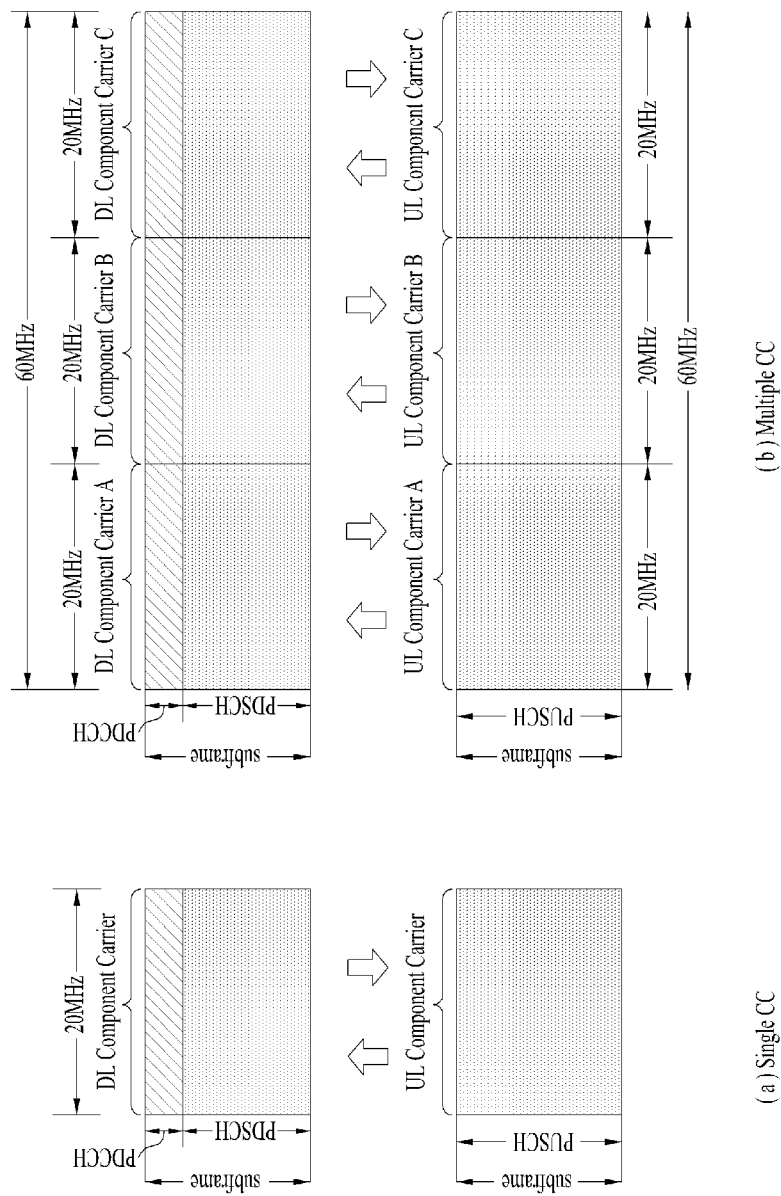
FIG. 6 illustrates an example of CCs and CA in the LTE-A system, which are used in embodiments of the present disclosure.

FIG. 6 illustrates an example of CCs and CA in the LTE-A system, which are used in embodiments of the present disclosure.

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguraiton message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present disclosure.

FIG. 6(a) illustrates a single carrier structure in the LTE system. There are a DL CC and a UL CC and one CC may have a frequency range of 20 MHz.

FIG. 6(b) illustrates a CA structure in the LTE-A system. In the illustrated case of FIG. 6(b), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher-layer message such as an RRC message or by system information. For example, a set of DL resources and UL resources may be configured based on linkage indicated by System Information Block Type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

Figure 7:
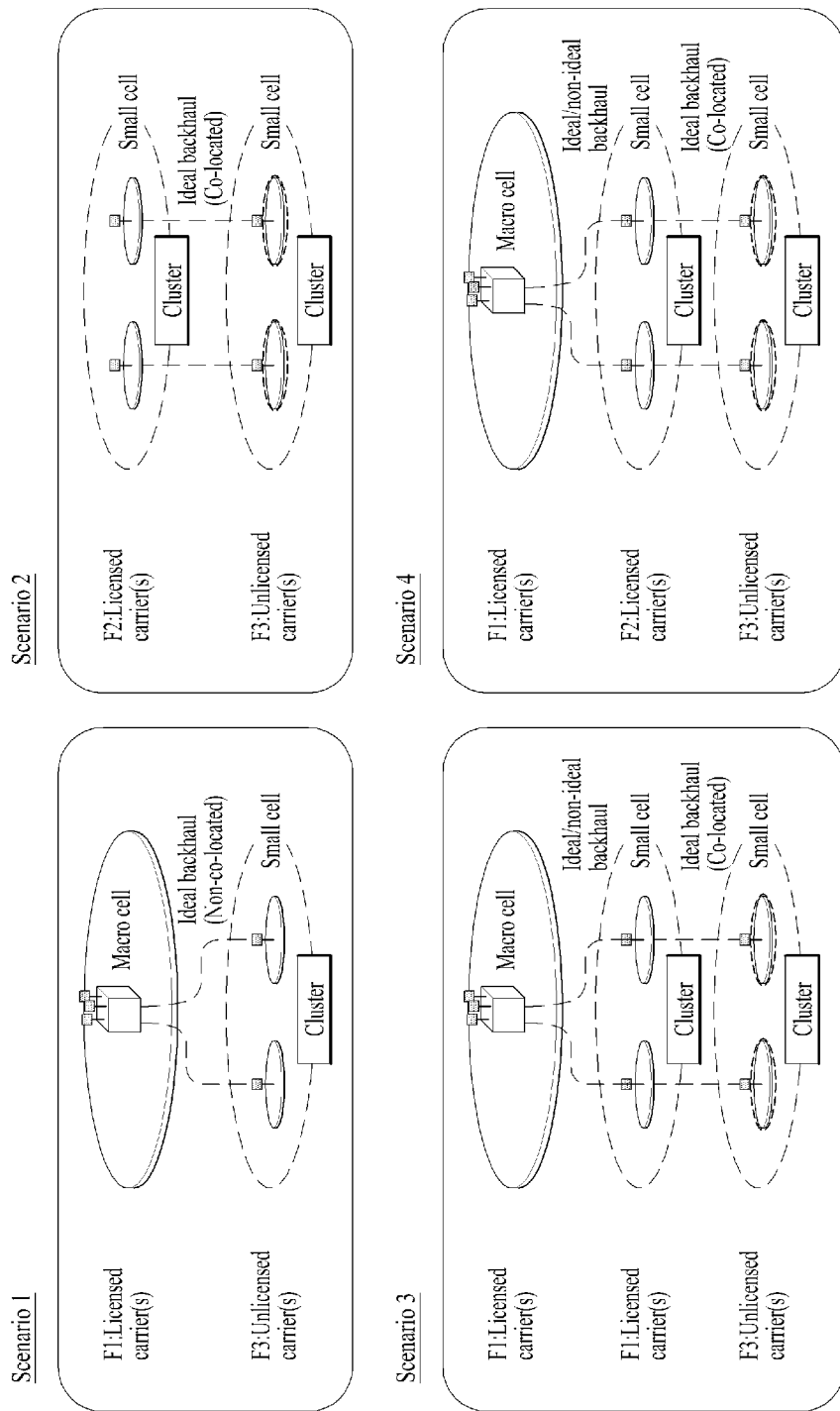
FIG. 7 is a diagram for exemplary Licensed-Assisted Access (LAA) scenarios.

FIG. 7 is a diagram for exemplary Licensed-Assisted Access (LAA) scenarios.

Carrier aggregation with at least one SCell operating in the unlicensed spectrum is referred to as Licensed-Assisted Access (LAA). In LAA, the configured set of serving cells for a UE therefore always includes at least one SCell operating in the unlicensed spectrum, also called LAA SCell. Unless otherwise specified, LAA SCells act as regular SCells and are limited to downlink transmissions in this release.

If the absence of IEEE802.11n/11ac devices sharing the carrier cannot be guaranteed on a long term basis (e.g., by level of regulation), and for this release if the maximum number of unlicensed channels that E-UTRAN can simultaneously transmit on is equal to or less than 4, the maximum frequency separation between any two carrier center frequencies on which LAA SCell transmissions are performed should be less than or equal to 62 MHz. The UE is required to support frequency separation in accordance with 36.133.

LAA eNB applies Listen-Before-Talk (LBT) before performing a transmission on LAA SCell. When LBT is applied, the transmitter listens to/senses the channel to determine whether the channel is free or busy. If the channel is determined to be free, the transmitter may perform the transmission; otherwise, it does not perform the transmission. If an LAA eNB uses channel access signals of other technologies for the purpose of LAA channel access, it shall continue to meet the LAA maximum energy detection threshold requirement. The unlicensed band can be used for a Wi-Fi band or a Bluetooth band.

It has been agreed that the LTE CA framework is reused as the baseline for LAA, and that the unlicensed carrier can only be configured as SCell. The SCell over unlicensed spectrum may be downlink only or bi-directional with DL only scenario being prioritized in the SI. LAA only applies to the operator deployed small cells. Coexistence and fair sharing with other technologies is an essential requirement for LAA in all regions.

Regarding FIG. 7, LAA targets the carrier aggregation operation in which one or more low power SCells operate in unlicensed spectrum. LAA deployment scenarios encompass scenarios with and without macro coverage, both outdoor and indoor small cell deployments, and both co-location and non-co-location (with ideal backhaul) between licensed and unlicensed carriers. FIG. 7 shows four LAA deployment scenarios, where the number of licensed carriers and the number of unlicensed carriers can be one or more. As long as the unlicensed small cell operates in the context of the carrier aggregation, the backhaul between small cells can be ideal or non-ideal. In scenarios where carrier aggregation is operated within the small cell with carriers in both the licensed and unlicensed bands, the backhaul between macro cell and small cell can be ideal or non-ideal.

Scenario 1: Carrier aggregation between licensed macro cell (F1) and unlicensed small cell (F3).

Scenario 2: Carrier aggregation between licensed small cell (F2) and unlicensed small cell (F3) without macro cell coverage.

Scenario 3: Licensed macro cell and small cell (F1), with carrier aggregation between licensed small cell (F1) and unlicensed small cell (F3).

Scenario 4: Licensed macro cell (F1), licensed small cell (F2) and unlicensed small cell (F3). In this case, there is Carrier aggregation between licensed small cell (F2) and unlicensed small cell (F3). If there is ideal backhaul between macro cell and small cell, there can be carrier aggregation between macro cell (F1), licensed small cell (F2) and unlicensed small cell (F3). If dual connectivity is enabled, there can be dual connectivity between macro cell and small cell.

In the study to support deployment in unlicensed spectrum for the above scenarios, CA functionalities are used as a baseline to aggregate PCell/PSCell on licensed carrier and SCell on unlicensed carrier. When non-ideal backhaul is applied between a Macro cell and a small cell cluster in the Scenarios 3 and 4, small cell on unlicensed carrier has to be aggregated with a small cell on licensed carrier in the small cell cluster through ideal backhaul. The focus is to identify the need of and, if necessary, evaluate needed enhancements to the LTE RAN protocols applicable to the carrier aggregation in all the above scenarios.

Figure 8:
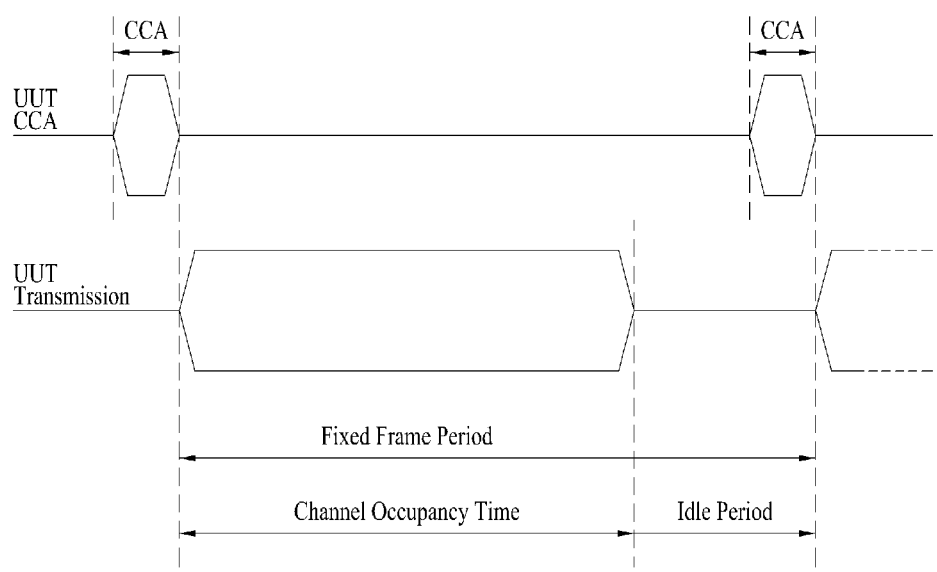
FIG. 8 is an example of LBT operation of a Frame Based Equipment (FBE)

FIG. 8 is an example of LBT operation of a Frame Based Equipment (FBE).

The Listen-Before-Talk (LBT) procedure is defined as a mechanism by which an equipment applies a clear channel assessment (CCA) check before using the channel The CCA utilizes at least energy detection to determine the presence or absence of other signals on a channel in order to determine if a channel is occupied or clear, respectively. European and Japanese regulations mandate the usage of LBT in the unlicensed bands. Apart from regulatory requirements, carrier sensing via LBT is one way for fair sharing of the unlicensed spectrum and hence it is considered to be a vital feature for fair and friendly operation in the unlicensed spectrum in a single global solution framework.

According to ETSI regulation (EN 301 893 V1.7.1) of the Europe, two LBT operations respectively referred to as a FBE (Frame Based Equipment) and an LBE (Load Based Equipment) are shown as an example. The FBE corresponds to an equipment where the transmit/receive structure is not directly demand-driven but has fixed timing and the LBE corresponds to an equipment where the transmit/receive structure is not fixed in time but demand-driven.

The FBE configures a fixed frame using channel occupancy time (e.g., 1~10 ms) corresponding to time capable of lasting transmission when a communication node has succeeded in channel access and an idle period corresponding to minimum 5% of the channel occupancy time. CCA is defined by an operation of monitoring a channel during a CCS slot (minimum 20 µs) at an end part of the idle period.

In this case, a communication node periodically performs the CCA in a fixed frame unit. If a channel is in an unoccupied state, the communication node transmits data during the channel occupancy time. If a channel is in an occupied state, the communication node postpones data transmission and waits until a CCA slot of a next period.

Figure 9A:
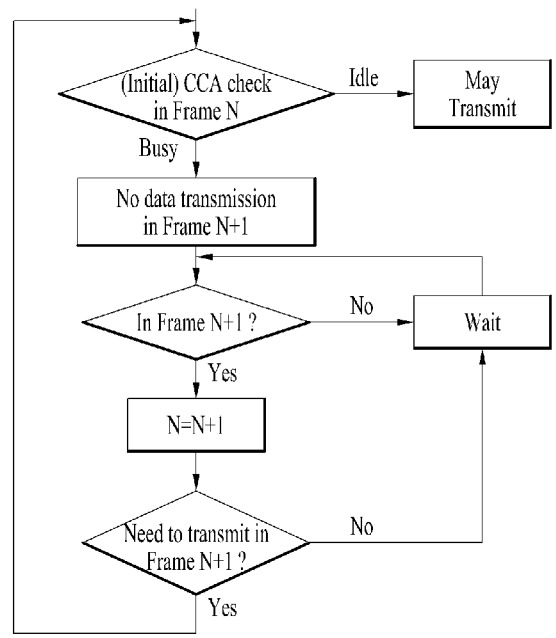
FIG. 9A is an illustration of the CCA check procedure for FBE.
Figure 9B:
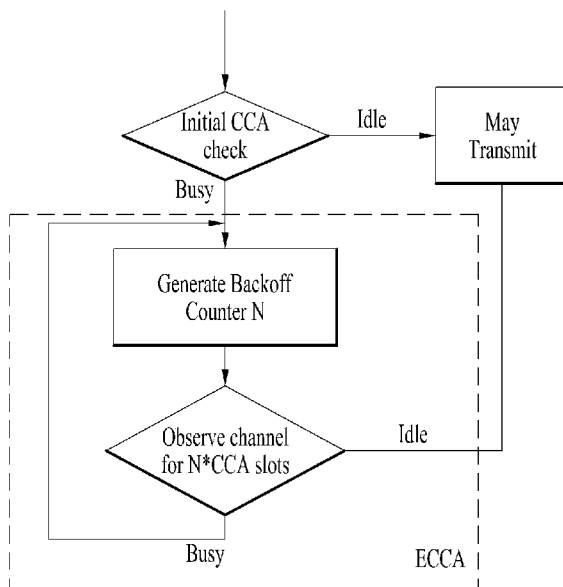
FIG. 9B is an illustration of the CCA check and backoff procedures for LBE.

A CCA (clear channel assessment) check and backoff mechanism are two key components of channel evaluation stage. FIG. 9A illustrates the CCA check procedure for FBE, in which no backoff mechanism is needed. FIG. 9A illustrates the CCA check and backoff procedure for LBE.

In order to deploy LAA eNB in regions where LBT is required, LAA eNB shall comply with LBT requirements in those regions. In addition, the LBT procedures shall be specified such that fair sharing of the unlicensed spectrum may be achieved between LAA devices themselves and among LAA and other technologies, e.g. WiFi.

After eNB acquires the unlicensed spectrum through LBT procedure successfully, it may notify its UEs the result so that preparations may be made accordingly for transmission, e.g., UE may start measurements.

CCA check (FBE and LBE) and backoff mechanism (LBE) are two major components of LBT operation, and thus are worth further clarification or study in order to fulfil LBT requirement efficiently in LAA system. Since the LBT procedure is in preparation for transmitting data or signals over unlicensed channel, it is straightforward that both MAC and PHY layers are closely involved in the LBT process. FIGS. 10A to 10D illustrate our views on the interaction and function split between MAC and PHY during the CCA check and backoff operations. They can be used to help identify the potential impacts that LBT requirements brought to RAN2.

Figure 10A:
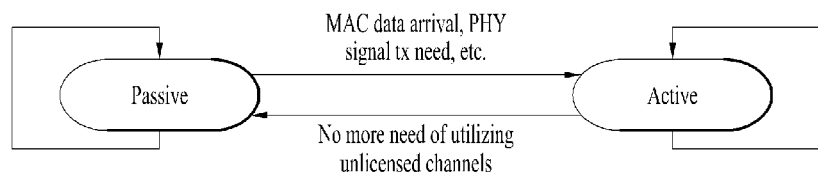
FIG. 10A is a diagram for State Transition Diagram for a LAA eNB.
Figure 10B:
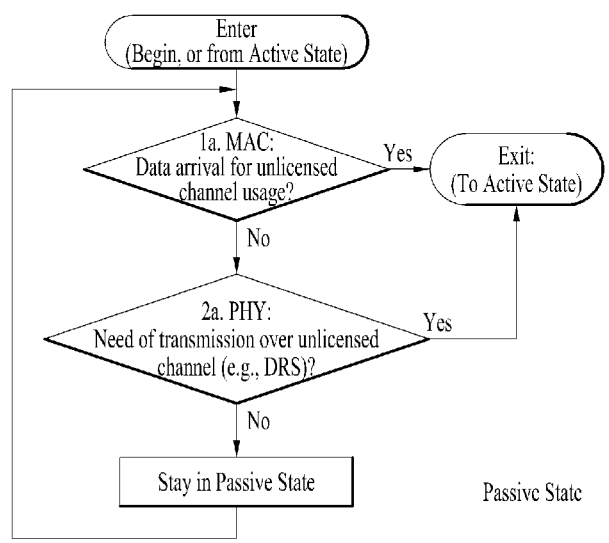
FIG. 10B is a diagram for Passive State operations for FBE and LBE.
Figure 10C:
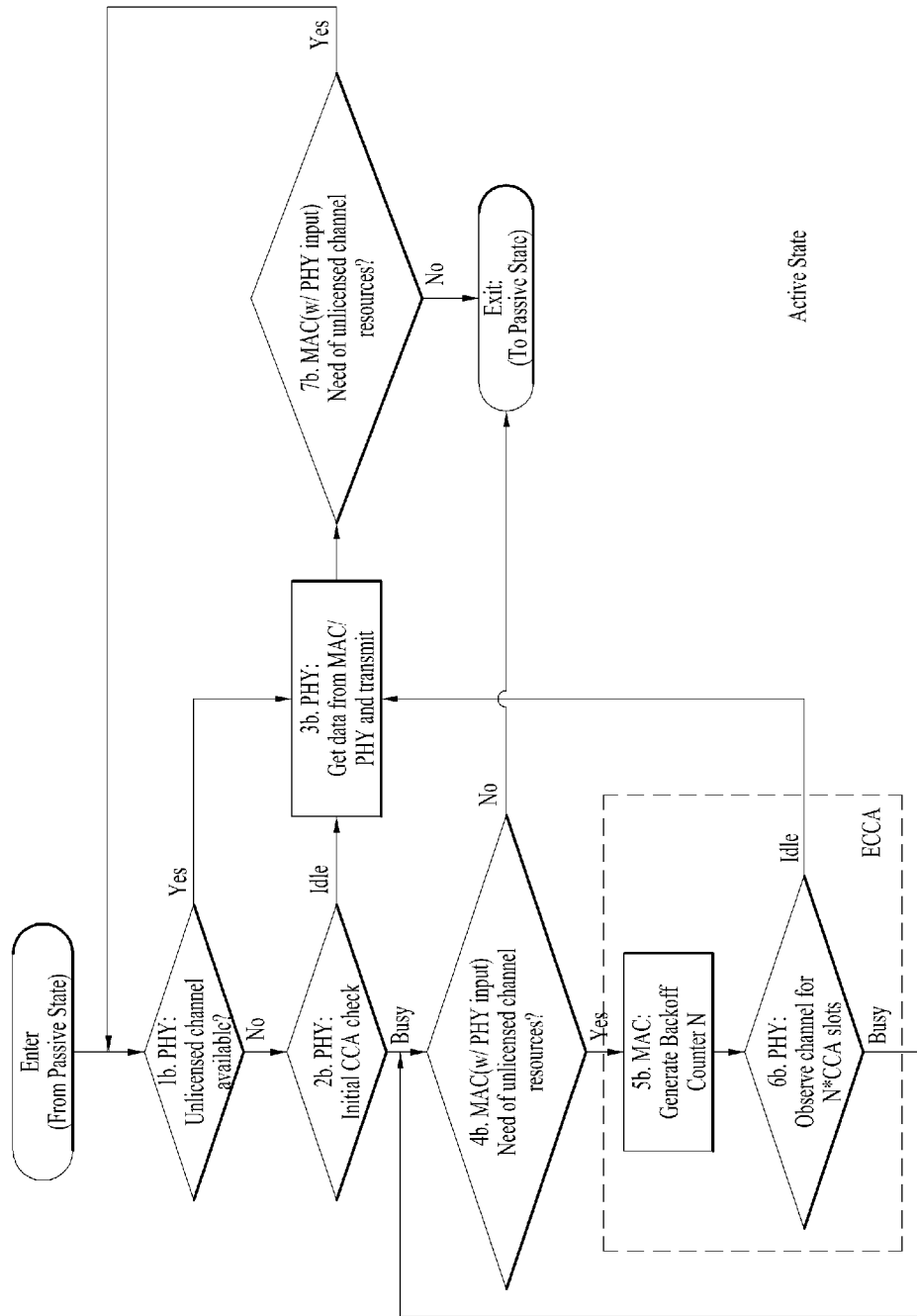
FIG. 10C is a diagram for Active State operations for LBE, and 10D is a diagram for Active State operations for FBE.

FIG. 10A is a diagram for State Transition Diagram for a LAA eNB, FIG. 10B is a diagram for Passive State operations for FBE and LBE, FIG. 10C is a diagram for Active State operations for LBE, and 10D is a diagram for Active State operations for FBE.

An LAA eNB operating status is classified as in either Active State or Passive State, as shown in FIG. 10A.

The passive state means that an LAA eNB has no need of utilizing unlicensed channels, and the active state means that an LAA eNB is in need of unlicensed resources. The transition from Passive State to Active State is triggered when radio resources over unlicensed channel is needed.

FIG. 10B depicts the operation in Passive State in more details, and is applicable to both FBE and LBE. The transition from Active State to Passive State occurs when there is no more need of unlicensed channel.

FIG. 10C outlines the operation in Active State, assuming LBE Option B requirements.

As shown in the FIG. 10C, PHY checks the availability of unlicensed channel and transmits (steps 1b, 2b, 3b and 6b), while MAC makes the scheduling decision and decides whether radio resources over unlicensed carrier is needed (steps 4b and 7b). In addition, MAC also generates backoff counter N (step 5b).

It is worth pointing out that scheduling decision in 4b and 7b considers both licensed and unlicensed channel resources. User data can be directed for transmission on either licensed or unlicensed channel When MAC evaluates the demand for unlicensed channel resources (steps 4b and 7b), it may take PHY's need into consideration, e.g., whether DRS will be transmitted soon. Step 3b includes not only the time eNB transmits data over the unlicensed channel, but also the idle period that is required to fulfil LBT requirements, as well as the short control signalling transmission duration. The initial CCA check (step 2b) is triggered by the demand for unlicensed channel resources, such as MAC data and/or PHY signalling. This is in line with "demand-driven" definition of LBE.

For ECCA check (steps 5b and 6b), MAC provides the backoff counter N and PHY is in charge of starting and performing CCA check in each of the N ECCA slots. The reason of letting MAC but not PHY generate backoff counter value N is that the MAC scheduler has the better knowledge/prediction regarding the availability of data that may be transmitted or offloaded over unlicensed carrier(s). In addition, the knowledge of value N will help MAC scheduler predict buffering delay to some extent. At the end of a failed ECCA and before PHY starts a new round of ECCA, it is reasonable for PHY to check with MAC first whether there is still any need to access the resources of unlicensed channel If MAC scheduler prefers to use licensed carriers for data transmissions in the next several subframes, or if MAC empties its buffer already, there is no point for PHY to start a new round of ECCA. Because of the necessity of checking with MAC (step 4b) and the benefit of MAC knowing N value, it is preferred that MAC provides the backoff counter N to PHY.

Figure 10D:
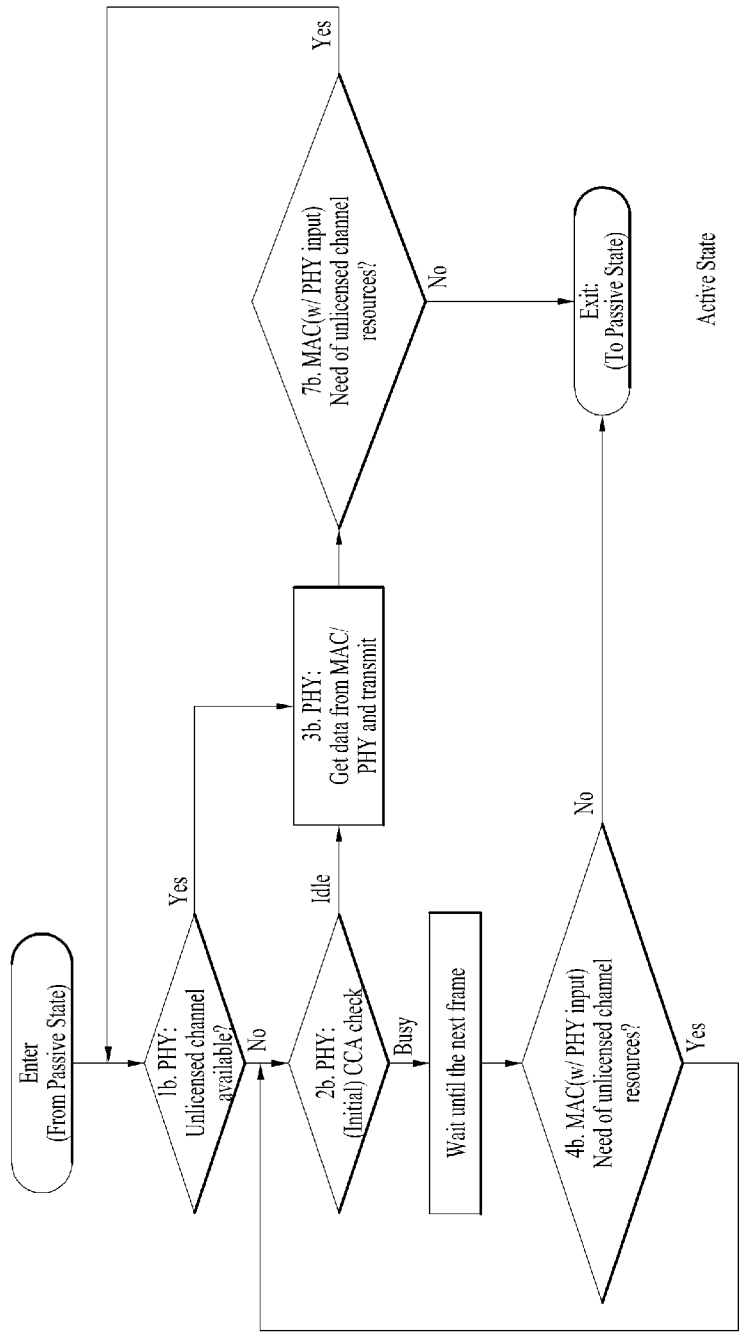

FIG. 10D outlines the operation in Active State following FBE requirements. Interpretation of each step is similar to that in FIG. 10C.

Figure 11:
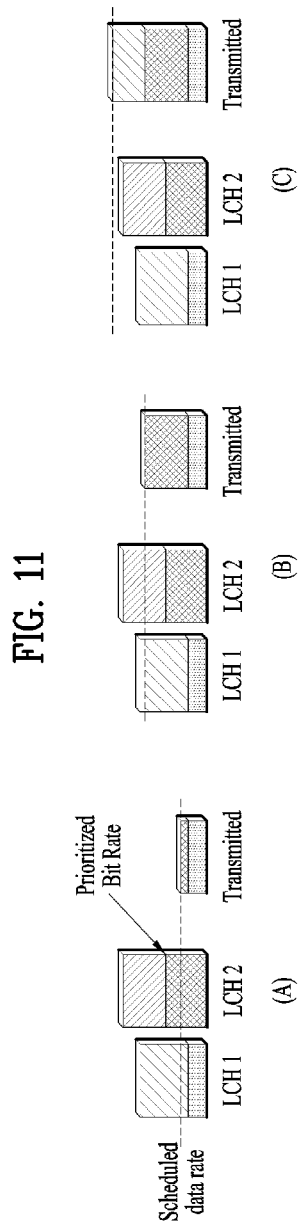
FIG. 11 is a diagram for prioritization of two logical channels for three different uplink grants.

FIG. 11 is a diagram for prioritization of two logical channels for three different uplink grants.

Multiple logical channels of different priorities can be multiplexed into the same transport block using the same MAC multiplexing functionality as in the downlink. However, unlike the downlink case, where the prioritization is under control of the scheduler and up to the implementation, the uplink multiplexing is done according to a set of well-defined rules in the terminal as a scheduling grant applies to a specific uplink carrier of a terminal, not to a specific radio bearer within the terminal. Using radio-bearer-specific scheduling grants would increase the control signaling overhead in the downlink and hence per-terminal scheduling is used in LTE.

The simplest multiplexing rule would be to serve logical channels in strict priority order. However, this may result in starvation of lower-priority channels; all resources would be given to the high-priority channel until its transmission buffer is empty. Typically, an operator would instead like to provide at least some throughput for low-priority services as well. Therefore, for each logical channel in an LTE terminal, a prioritized data rate is configured in addition to the priority value. The logical channels are then served in decreasing priority order up to their prioritized data rate (Prioritized Bit Rate, PRB), which avoids starvation as long as the scheduled data rate is at least as large as the sum of the prioritized data rates. Beyond the prioritized bit rates, channels are served in strict priority order until the grant is fully exploited or the buffer is empty. This is illustrated in FIG. 11.

The Logical Channel Prioritization procedure is applied when a new transmission is performed.

RRC controls the scheduling of uplink data by signalling for each logical channel: priority where an increasing priority value indicates a lower priority level, prioritisedBitRate which sets the Prioritized Bit Rate (PBR), bucketSizeDuration which sets the Bucket Size Duration (BSD).

The MAC entity shall maintain a variable Bj for each logical channel j. Bj shall be initialized to zero when the related logical channel is established, and incremented by the product PBR×TTI duration for each TTI, where PBR is Prioritized Bit Rate of logical channel j. However, the value of Bj can never exceed the bucket size and if the value of Bj is larger than the bucket size of logical channel j, it shall be set to the bucket size. The bucket size of a logical channel is equal to PBR×BSD, where PBR and BSD are configured by upper layers.

The MAC entity shall perform the following Logical Channel Prioritization procedure when a new transmission is performed. The MAC entity shall allocate resources to the logical channels in the following steps.

Step 1: All the logical channels with Bj>0 are allocated resources in a decreasing priority order. If the PBR of a logical channel is set to "infinity", the MAC entity shall allocate resources for all the data that is available for transmission on the logical channel before meeting the PBR of the lower priority logical channels.

Step 2: the MAC entity shall decrement Bj by the total size of MAC SDUs served to logical channel j in Step 1.

Step 3: if any resources remain, all the logical channels are served in a strict decreasing priority order (regardless of the value of Bj) until either the data for that logical channel or the UL grant is exhausted, whichever comes first. Logical channels configured with equal priority should be served equally.

The MAC entity shall not transmit data for a logical channel corresponding to a radio bearer that is suspended.

Figure 12A:
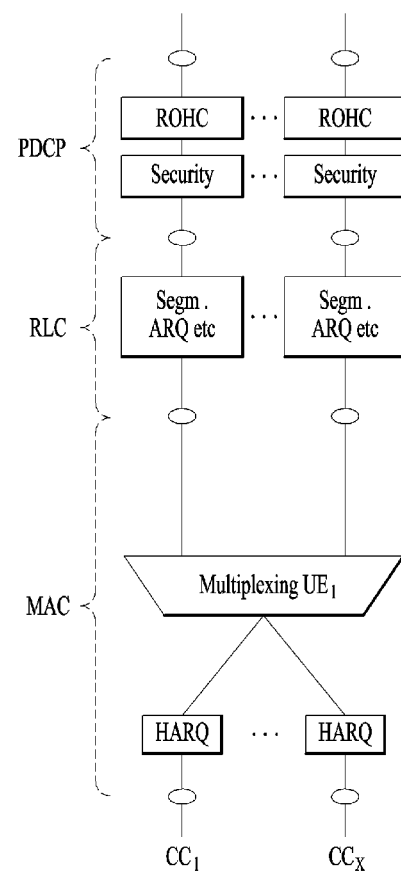
FIGS. 12A and 12B are diagrams for protocol architecture in carrier aggregation.
Figure 12B:
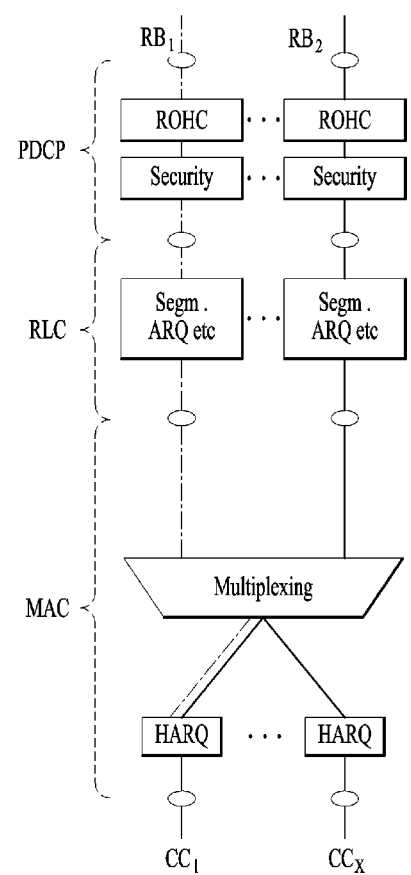

FIGS. 12A and 12B are diagrams for protocol architecture in carrier aggregation.

QoS supporting is implemented using radio bearers in air interface. As shown in FIG. 12A below, in current carrier aggregation, a radio bearer can be transmitted/received on any serving cell, and there is no special handling for QoS since there is no fundamental difference on the radio environments on all serving cells.

The QoS of the DL radio bearer can be guaranteed by mapping high QoS RB to licensed cell and low QoS RB to unlicensed cell. However, the QoS of the UL radio bearer cannot be guaranteed because a UL RB can be transmitted on any of the serving cells, and no difference between serving cells is assumed in CA.

The radio environment in unlicensed spectrum is quite different compared with that on licensed spectrum (current LTE systems). In unlicensed spectrum, there could be various sources for interference which is outside the control of the operator: other RATs (e.g. WiFi) or LAA-capable eNB/UEs of other operators etc. In the extreme case, the unlicensed carrier might be switched off due to very strong interference. In addition, LBT and DTX should be supported to meet regulatory requirements. This could impact QoS of some bearers, e.g. latency requirements might not be satisfied. Such bearers could be voice, real time gaming, or SRB. On the other hand, it is expected that there would be no impact on QoS of services like best-effort service when using LAA.

Here we discuss in detail about the impact on the latency due to the unstable radio condition in unlicensed spectrum. Uplink is used as an example here. Consider a bearer carried over RLC UM. Whenever there is an UL grant in one of the serving cells, UE applies logical channel prioritization to decide how to utilize the UL grant. When doing so, UE does not distinguish between which carrier it receives UL grant. It is possible that UE transmits data of a delay sensitive service on unlicensed spectrum, and some packets could be lost due to the unstable radio conditions or more latency is expected to successfully complete HARQ operation. Therefore, the delay requirement might not be satisfied due to unstable radio condition in unlicensed spectrum.

Regarding this QoS issue, we discuss some potential solution.

One possibility is to adopt dual connectivity architecture. By categorizing bearers handled by licensed carriers as MCG bearer and bearers handled by both licensed and unlicensed carriers as split bearer, the QoS issue can be resolved. However, carrier aggregation architecture is assumed in LAA and dual connectivity might be out of scope of the SI. There might be some drawbacks as well: e.g. the additional PDCP reordering for split bearer, some additional MAC/PHY overhead compared with carrier aggregation (e.g. RACH is required for SeNB addition, while RACH is not mandatory for SCell addition in case of CA), and UL data restriction for split bearer. To overcome these issues, some enhancements are needed if dual connectivity like architecture is used for LAA.

In another solution, delay sensitive services (e.g. VoIP, real time gaming) or services require high reliability (e.g. Signaling Radio Bearer) can be mapped only on licensed carriers. The principle is similar as that illustrated in FIG. 12B. In DL, this can be implemented in eNB implementation. For UL, one simple approach is to modify logical channel prioritization procedure (LCP) so that UE only permits logical channels when certain carriers are scheduled. For example, SRB transmission can be allowed when licensed carriers are scheduled.

In UL, when the UE receives a UL grant, the UE performs Logical Channel Prioritization procedure to allocate UL resource to each of RB. As there is no restriction on mapping between RB and cell, data of a RB can be transmitted on any of the cells. Then, the data of a high QoS RB, e.g. delay-sensitive RB, can be transmitted on unlicensed cell, in which case the delay requirement may not be met due to LBT procedure. Thus, it should be discussed first whether QoS differentiation is needed between licensed cell and unlicensed cell.

FIG. 13 is an example for logical channel configuration information element.

The IE LogicalChannelConfig is used to configure the logical channel parameters.

Regarding FIG. 13, "bucketsizeDuration" is for logical channel prioritization. A value is in milliseconds. The value ms50 corresponds to 50 ms, ms100 corresponds to 100 ms and so on.

"logicalChannelGroup" is mapped to a logical channel group for BSR reporting. "logicalChannelSR-Mask corresponds to Controlling SR triggering on a logical channel basis when an uplink grant is configured. "logicalChannelSR-Prohibit" means that a value TRUE indicates that the logicalChannelSR-ProhibitTimer is enabled for the logical channel E-UTRAN only (optionally) configures the field (i.e. indicates value TRUE) if logicalChannelSR-ProhibitTimer is configured. "prioritisedBitRate" is for logical channel prioritization. A value in kilobytes/second. The value kBps0 corresponds to 0 kB/second, kBps8 corresponds to 8 kB/second, kBps16 corresponds to 16 kB/second and so on. Infinity is the only applicable value for SRB1 and SRB2. "Priority" means logical channel priority.

Preferably, whether it can be offloaded to LAA SCells or whether it may only be served by licensed cell is configured per a radio bearer or a logical channel.

How to perform Logical Channel Prioritization (LCP) procedure in LAA has not been discussed, considering the configuration that some logical channels can be transmitted to Unlicensed cell (U-cell) while other logical channels can only be transmitted to Licensed cell (L-cell).

Figure 14:
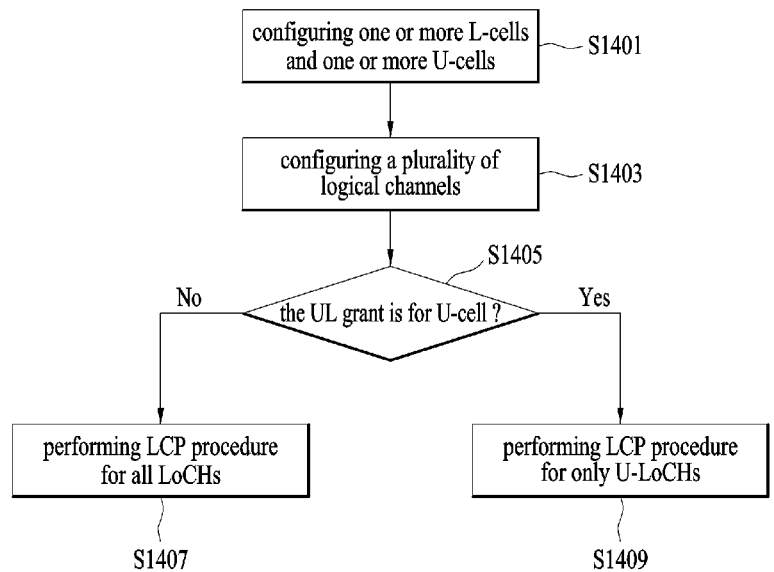
FIG. 14 is a conceptual diagram for performing a logical channel prioritization in a carrier aggregation with at least one SCell operating in an unlicensed spectrum according to embodiments of the present invention.

FIG. 14 is a conceptual diagram for performing a logical channel prioritization in a carrier aggregation with at least one SCell operating in an unlicensed spectrum according to embodiments of the present invention.

The invention is that the MAC entity performs LCP procedure for all or subset of configured logical channels depending on whether the UL grant is for L-cell or U-cell, respectively.

A UE can be configured with one or more L-cells and one or more U-cells (S1401).

And the UE is configured with a plurality of logical channels (S1403). Each logical channel is configured with the indication of whether it can be transmitted to U-cell. Let's call this type of logical channel as U-LoCH (second type logical channel). The other type of logical channel, i.e. the logical channel that cannot be transmitted to U-cell, is called L-LoCH (first type logical channel).

When the UE receives UL grant, the UE can check whether the UL grant is for U-cell or L-cell (S1405).

If an UL grant is received/configured for L-cell, i.e. the MAC PDU on the UL grant is transmitted on L-cell, the MAC entity performs LCP procedure for all LoCHs, i.e. for both L-LoCHs and U-LoCHs. That is, the MAC PDU transmitted to L-cell can contain RLC PDUs from all LoCHs (S1407).

If an UL grant is received/configured for U-cell, i.e. the MAC PDU on the UL grant is transmitted on U-cell, the MAC entity performs LCP procedure for only U-LoCHs. That is, the MAC PDU transmitted to U-cell can contain RLC PDUs from only U-LoCHs (S1409).

Furthermore, the UE can receive an indication for each of the plurality of logical channels indicating whether a corresponding logical channel can be transmitted to the second cell group. The indication can be received when the corresponding logical channel is configured.

Preferably, the first and the second LCP procedures are performed by a respective MAC entity associated with the corresponding logical channels.

In addition, the UL grant for the U-cell can be received by one of L-cells, if cross carrier scheduling is applied.

Figure 15:
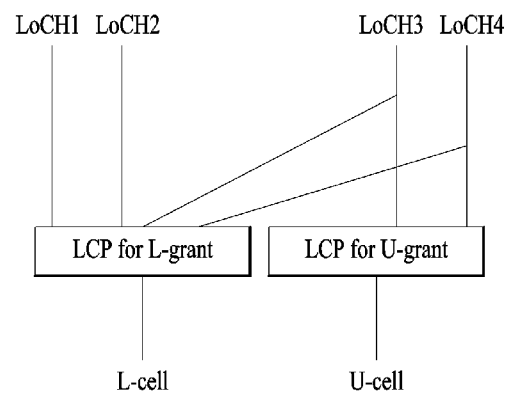
FIG. 15 is an example for performing a logical channel prioritization in a carrier aggregation with at least one SCell operating in an unlicensed spectrum according to embodiments of the present invention

FIG. 15 is an example for performing a logical channel prioritization in a carrier aggregation with at least one SCell operating in an unlicensed spectrum according to embodiments of the present invention.

The UE is configured with four LoCHs 1~4. The LoCH1 and LoCH2 cannot be transmitted to U-cell, and LoCH3 and LoCH4 can be transmitted to U-cell. When a UL grant to be transmitted to L-cell (L-grant) is received, the UE performs LCP procedure for all configured LoCHs, i.e. LoCH 1~4. The UE generates a MAC PDU including RLC PDU from LoCH 1~4, and transmits the MAC PDU to the L-cell. On the other hand, when a UL grant to be transmitted to U-cell (U-grant) is received, the UE performs LCP procedure for only LoCH3 and LoCH4. The UE generates a MAC PDU including RLC PDU from LoCH3 and LoCH4, and transmits the MAC PDU to the U-cell. If cross carrier scheduling is applied, the UL grant for U-cell can be received either a U-Cell or an L-cell.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a user equipment (UE) operating in a wireless communication system, the method comprising:
configuring a plurality of serving cells which comprises one or more licensed cells and one or more unlicensed cells;
configuring a plurality of logical channels,
wherein each of the plurality of logical channels is configured as allowed or not allowed to be transmitted on unlicensed cells;
receiving a uplink grant; and
performing, at a medium access control (MAC) entity associated with the plurality of logical channels, a logical channel prioritization (LCP) procedure based on the uplink grant,
wherein the MAC entity performs the LCP procedure for all of the plurality of logical channels, when the uplink grant is for one of the one or more licensed cells; and
wherein the MAC entity performs the LCP procedure only for logical channels allowed to be transmitted on unlicensed cells, when the uplink grant is for one of the one or more unlicensed cells.

2. The method according to claim 1, further comprising:
generating a MAC protocol data unit (PDU) including radio link control (RLC) PDUs from all of the plurality of logical channels, according to the LCP procedure, when the uplink grant is for one of the one or more licensed cells.

3. The method according to claim 1, further comprising:
generating a MAC protocol data unit (PDU) including radio link control (RLC) PDUs from only the logical channels allowed to be transmitted on unlicensed cells, according to the LCP procedure, when uplink grant is for one of the one or more unlicensed cells.

4. The method according to claim 1, further comprising:
receiving an indication for each of the plurality of logical channels,
wherein the indication indicates whether a corresponding logical channel is allowed to be transmitted on unlicensed cells.

5. The method according to claim 1, wherein the UL grant for one of the one or more unlicensed cells is received on one of the one or more licensed cells.

6. The method according to claim 1, wherein the one or more licensed cells and the one or more unlicensed cells are served by a base station.

7. The method according to claim 2, further comprising:
transmitting the MAC PDU.

8. The method according to claim 3, further comprising:
transmitting the MAC PDU.

9. The method according to claim 1, wherein the plurality of serving cells comprises a primary cell (PCell) and more than one secondary cells (SCells).

10. The method according to claim 9, wherein the MAC entity performs the LCP procedure for all of the plurality of logical channels, when the uplink grant is for a licensed cell configured as an SCell.

11. A user equipment (UE) for operating in a wireless communication system, the UE comprising:
a transceiver; and
a processor operably coupled with the transceiver and configured to:
configure a plurality of serving cells which comprises one or more licensed cells and one or more unlicensed cells;
configure a plurality of logical channels,
wherein each of the plurality of logical channels is configured as allowed or not allowed to be transmitted on unlicensed cells;
receive a uplink grant; and
perform, at a medium access control (MAC) entity associated with the plurality of logical channels, a logical channel prioritization (LCP) procedure based on the uplink grant,
wherein the processor is configured to perform, at the MAC entity, the LCP procedure for all of the plurality of logical channels, when the uplink grant is for one of the one or more licensed cells; and
wherein the processor is configured to perform, at the MAC entity, the LCP procedure for only logical channels allowed to be transmitted on unlicensed cells, when the uplink grant is for one of the one or more unlicensed cells.

12. The UE according to claim 11, wherein the processor is further configured to:
generate a MAC protocol data unit (PDU) including radio link control (RLC) PDUs from all of the plurality of logical channels, according to the LCP procedure, when the uplink grant is for one of the one or more licensed cells.

13. The UE according to claim 11, wherein the processor is further configured to:
generate a MAC protocol data unit (PDU) including radio link control (RLC) PDUs from only the logical channels allowed to be transmitted on unlicensed cells, according to the LCP procedure, when uplink grant is for one of the one or more unlicensed cells.

14. The UE according to claim 11, wherein the processor is further configured to:
receive, via the transceiver, an indication for each of the plurality of logical channels,
wherein the indication indicates whether a corresponding logical channel is allowed to be transmitted on unlicensed cells.

15. The UE according to claim 11, wherein the UL grant for one of the one or more unlicensed cells is received on one of the one or more licensed cells.

16. The UE according to claim 11, wherein the one or more licensed cells and the one or more unlicensed cells are served by a base station.

17. The UE according to claim 12, wherein the processor is configured to control the transceiver to transmit the MAC PDU.

18. The UE according to claim 13, wherein the processor is configured to control the transceiver to transmit the MAC PDU.

19. The UE according to claim 11, wherein the plurality of serving cells comprises a primary cell (PCell) and more than one secondary cells (SCells).

20. The UE according to claim 19, wherein the processor is configured to perform, at the MAC entity, the LCP procedure for all of the plurality of logical channels, when the uplink grant is for a licensed cell configured as an SCell.

* * * * *